US011240080B2

(12) United States Patent
Xu et al.

(10) Patent No.: US 11,240,080 B2
(45) Date of Patent: Feb. 1, 2022

(54) WIRELESS COMMUNICATION ELECTRONIC DEVICE AND METHOD, AND COMPUTER READABLE STORAGE MEDIUM

(71) Applicant: Sony Corporation, Tokyo (JP)

(72) Inventors: Jin Xu, Beijing (CN); Chaonan He, Beijing (CN); Hang Yang, Beijing (CN); Jianfei Cao, Beijing (CN)

(73) Assignee: SONY CORPORATION, Tokyo (JP)

( * ) Notice: Subject to any disclaimer, the term of this patent is extended or adjusted under 35 U.S.C. 154(b) by 73 days.

(21) Appl. No.: 16/638,152

(22) PCT Filed: Nov. 16, 2018

(86) PCT No.: PCT/CN2018/115844
§ 371 (c)(1),
(2) Date: Feb. 11, 2020

(87) PCT Pub. No.: WO2019/096239
PCT Pub. Date: May 23, 2019

(65) Prior Publication Data
US 2020/0169441 A1      May 28, 2020

(30) Foreign Application Priority Data
Nov. 20, 2017  (CN) .......................... 201711159608.9

(51) Int. Cl.
*H04L 27/26* (2006.01)
*H04L 5/00* (2006.01)
*H04L 5/10* (2006.01)
*H04W 72/04* (2009.01)

(52) U.S. Cl.
CPC ........ *H04L 27/2605* (2013.01); *H04L 5/0007* (2013.01); *H04L 5/0051* (2013.01); *H04L 5/10* (2013.01); *H04W 72/042* (2013.01)

(58) Field of Classification Search
CPC .............. H04L 27/2605; H04L 5/0007; H04L 5/0051; H04L 5/10; H04L 5/0094;
(Continued)

(56) References Cited

U.S. PATENT DOCUMENTS 10,326,566 B2 *  6/2019  Ko ........................ H04L 5/0048
10,911,197 B2 *  2/2021  Wang ................... H04L 5/0048
(Continued)

FOREIGN PATENT DOCUMENTS

| CN | 105075144 A | 11/2015 | |
|----|-------------|---------|--|
| WO | WO-2018075963 A1 * | 4/2018 | ........... H04L 5/0007 |
| WO | WO-2019030426 A1 * | 2/2019 | ....... H04L 25/03821 |

OTHER PUBLICATIONS

International Search Report and Written Opinion dated Jan. 25, 2019 for PCT/CN2018/115844 filed on Nov. 16, 2018, 10 pages including English Translation of the International Search Report.
(Continued)

*Primary Examiner* — Jay P Patel
(74) *Attorney, Agent, or Firm* — Xsensus LLP

(57) ABSTRACT

Provided are an electronic device and method for wireless communication, the electronic device comprises a processing circuit, which is configured for: generating a first indication indicating the number of orthogonal frequency division multiplexing symbols occupied by a front load-on demodulation reference signal; generating a second indication indicating a configuration of an additional demodulation reference signal; and determining a mode of demodulating the reference signal on the basis of the first indication and the second indication, and generating a mode index corresponding to the mode to provide to user equipment.

18 Claims, 11 Drawing Sheets

(a)

(b)

(c)

(d)

(58) Field of Classification Search
CPC .............. H04L 5/0091; H04L 27/2646; H04L 27/261; H04W 72/042
See application file for complete search history.

(56) References Cited

U.S. PATENT DOCUMENTS

| | | | |
|---|---|---|---|
| 10,939,321 B2* | 3/2021 | Davydov | H04W 28/0273 |
| 2012/0134338 A1 | 5/2012 | Ko et al. | |
| 2019/0149295 A1* | 5/2019 | Wang | H04L 5/0051 370/336 |
| 2019/0260528 A1* | 8/2019 | Ko | H04L 1/1671 |
| 2020/0137616 A1* | 4/2020 | Davydov | H04W 28/0289 |

OTHER PUBLICATIONS

KT Corp., "Discussion on remaining details of DMRS," 3GPP TSG RAN WG1 Meeting NR No. 3, R1-1716570, Nagoya, Japan, Sep. 18-21, 2017, pp. 1-3.

Spreadtrum Communications, "Considerations on DMRS for CP-OFDM," 3GPP TSG RAN WG1 Meeting NR No. 3, R1-1715512, Nagoya, Japan, Sep. 18-21, 2017, 12 pages.

Huawei et al: "Design of data transmission",3GPP Draft; R1-1715472, 3rd Generation Partnership Project (3GPP), F-06921 Sophia-Antipolis Cedex ; France vol. RAN WGI, No. Nagoya, Japan; Sep. 18, 2017-Sep. 21, 2017 Sep. 17, 2017 (Sep. 17, 2017) ,XP051338940.

ZTE et al: "Remaining details on DL DMRS and UL DMRS", 3GPP Draft; RI-1715449 Remaining Details on DL DMRS and UL DMRS, 3rd Generation Partnership Project (3GPP), Mobile Competence Centre ; 650, Route Des Lucioles ; F-06921 Sophia-Antipolis Cedex ; France vol. RAN WGI, No. Nagoya, Japan;Sep. 18, 2017-Sep. 21, 2017 Sep. 17, 2017 (Sep. 17, 2017), XP051338917.

Huawei et al: "Design of DL DMRS for data 1-15 transm1ss1on",3GPP Draft; RI-1700067, 3rd Generation Partnership Project (3GPP), F-06921 Sophia-Antipolis Cedex ; France vol. RAN WGI, No. Spokane, USA; Jan. 16, 2017-Jan. 20, 2017 Jan. 16, 2017 (Jan. 16, 2017), XP051207609.

* cited by examiner (a) (b)

(c)

(a)

(b)

(c)

(d)

(e)

(a)

(b)

(c)

(d)

(e)

WIRELESS COMMUNICATION ELECTRONIC DEVICE AND METHOD, AND COMPUTER READABLE STORAGE MEDIUM

CROSS-REFERENCE TO RELATED APPLICATIONS

This application is based on PCT filing PCT/CN2018/115844, filed Nov. 16, 2018, which claims the priority to Chinese Patent Application No. 201711159608.9, filed with the China National Intellectual Property Administration on Nov. 20, 2017, each of which is incorporated herein by reference in its entirety.

FIELD

Embodiments of the present disclosure generally relate to the technical field of wireless communications, particularly to setting of a demodulation reference signal in a New Radio Multiple In Multiple Out (NR MIMO) communication system, and more particularly to an electronic apparatus and a method for wireless communications and a computer-readable storage medium.

BACKGROUND

As one of the key physical layer technologies, the NR technology using the MIMO transmission can meet high-speed requirements in future communications. In 5G communication systems, various MIMO enhancement technologies have been extensively researched to cause the MIMO to be more suitable for high frequency bands, for example, above 6 GHz. The design of a Demodulation Reference Signal (DMRS) is one of hot issues in standardization work.

According to different scenarios in which a 5G communication system may be applied, different DMRS patterns need to be designed to meet different requirements, so as to accurately demodulate control information and reduce processing time required for demodulation.

SUMMARY

In the following, an overview of the present disclosure is given simply to provide basic understanding to some aspects of the present disclosure. It should be understood that this overview is not an exhaustive overview of the present disclosure. It is not intended to determine a critical part or an important part of the present disclosure, nor to limit the scope of the present disclosure. An object of the overview is only to give some concepts in a simplified manner, which serves as a preface of a more detailed description described later.

According to an aspect of the present disclosure, an electronic apparatus for wireless communications is provided. The electronic apparatus includes processing circuitry. The processing circuitry is configured to: generate a first indication indicating the number of orthogonal frequency division multiplexing symbols which are occupied by a front-loaded demodulation reference signal; generate a second indication indicating a configuration of an additional demodulation reference signal; and determine, based on the first indication and the second indication, a pattern of a demodulation reference signal, and generate a pattern index corresponding to the pattern to be provided to user equipment.

According to another aspect of the present disclosure, an electronic apparatus for wireless communications is provided. The electronic apparatus includes processing circuitry. The processing circuitry is configured to: acquire, from a base station, a pattern index indicating a pattern of a demodulation reference signal, where the pattern of the demodulation reference signal indicates: the number and a location of orthogonal frequency division multiplexing symbols which are occupied by a front-loaded demodulation reference signal, and a configuration of an additional demodulation reference signal; and acquire the demodulation reference signal based on the pattern indicated by the pattern index.

According to another aspect of the present disclosure, a method for wireless communications is provided. The method includes: generating a first indication indicating the number of orthogonal frequency division multiplexing symbols which are occupied by a front-loaded demodulation reference signal; generating a second indication indicating a configuration of an additional demodulation reference signal; and determining, based on the first indication and the second indication, a pattern of a demodulation reference signal, and generating a pattern index corresponding to the pattern to be provided to user equipment.

According to another aspect of the present disclosure, a method for wireless communications is provided. The method includes: acquiring, from a base station, a pattern index indicating a pattern of a demodulation reference signal, where the pattern of the demodulation reference signal indicates: the number and a location of orthogonal frequency division multiplexing symbols which are occupied by a front-loaded demodulation reference signal; and a configuration of an additional demodulation reference signal; and acquiring the demodulation reference signal based on the pattern indicated by the pattern index.

According to other aspects of the present disclosure, there are further provided computer program codes and computer program products for implementing the methods above, and a computer readable storage medium having recorded thereon the computer program codes for implementing the methods described above.

With the electronic apparatus and the method according to the embodiments of the present disclosure, information about the pattern of the DMRS is transmitted by a pattern index, which can be flexibly applied to various scenarios.

These and other advantages of the present disclosure will be more apparent by illustrating in detail a preferred embodiment of the present disclosure in conjunction with accompanying drawings below.

BRIEF DESCRIPTION OF THE DRAWINGS

To further set forth the above and other advantages and features of the present disclosure, detailed description will be made in the following taken in conjunction with accompanying drawings in which identical or like reference signs designate identical or like components. The accompanying drawings, together with the detailed description below, are incorporated into and form a part of the specification. It should be noted that the accompanying drawings only illustrate, by way of example, typical embodiments of the present disclosure and should not be construed as a limitation to the scope of the disclosure. In the accompanying drawings.

DETAILED DESCRIPTION OF EMBODIMENTS

An exemplary embodiment of the present disclosure will be described hereinafter in conjunction with the accompanying drawings. For the purpose of conciseness and clarity, not all features of an embodiment are described in this specification. However, it should be understood that multiple decisions specific to the embodiment have to be made in a process of developing any such embodiment to realize a particular object of a developer, for example, conforming to those constraints related to a system and a business, and these constraints may change as the embodiments differs. Furthermore, it should also be understood that although the development work may be very complicated and time-consuming, for those skilled in the art benefiting from the present disclosure, such development work is only a routine task.

Here, it should also be noted that in order to avoid obscuring the present disclosure due to unnecessary details, only a device structure and/or processing steps closely related to the solution according to the present disclosure are illustrated in the accompanying drawing, and other details having little relationship to the present disclosure are omitted.

First Embodiment

Figure 1:
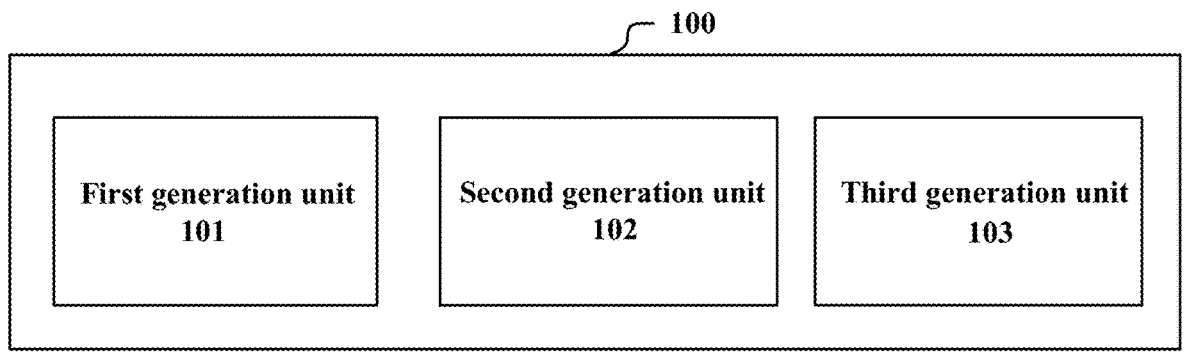
FIG. 1 is a functional block diagram showing an electronic apparatus for wireless communications according to an embodiment of the present disclosure.

FIG. 1 is a functional block diagram showing an electronic apparatus 100 for wireless communications according to an embodiment of the present disclosure. As shown in FIG. 1, the electronic apparatus 100 includes a first generation unit 101, a second generation unit 102, and a third generation unit 103. The first generation unit 101 is configured to generate a first indication indicating the number of Orthogonal Frequency Division Multiplexing (OFDM) symbols which are occupied by a front-loaded DMRS. The second generation unit 102 is configured to generate a second indication indicating a configuration of an additional DMRS. The third generation unit 103 is configured to determine a pattern of a DMRS based on the first indication and the second indication, and generate a pattern index corresponding to the pattern to be provided to user equipment (UE).

The first generation unit 101, the second generation unit 102, and the third generation unit 103 may be implemented by one or more processing circuits, which may be implemented as chips, for example. The electronic apparatus 100 may, for example, be located at or communicatively connected to a network management side, such as a base station side.

As mentioned above, there are multiple application scenarios in the NR MIMO technology. Different DMRS configurations may be required according to characteristics of different application scenarios to obtain the optimal performance. For example, in a case that power of a user is limited or a Signal to Interference and Noise Ratio (SINR) value of the user is low, a front-loaded DMRS with a high density may be configured for the user to achieve better performance. In this case, an additional DMRS having the same density as the front-loaded DMRS or having a density lower than that of the front-loaded DMRS may be configured. However, in some cases, for example, in a case that the SINR value of the user is high or a moving speed of the user is low, the front-loaded DMRS having a high density may result in large DMRS overhead, reducing the number of resource elements (REs) available for data transmission.

With the electronic apparatus 100 in this embodiment, the front-loaded DMRS and the additional DMRS can be configured respectively, improving flexibility of the DMRS configuration, thereby appropriately reducing signaling overhead and improving data transmission efficiency.

In an example, the first generation unit 101 may be configured to generate the first indication based on the number of transmission layers or the number of ports for the DMRS, i.e., determine the number of the OFDM symbols which are occupied by the front-loaded DMRS. For example, in a case that the number of transmission layers or the number of ports for the orthogonal DMRS is large, the front-loaded DMRS of two OFDM symbols may be configured. Specifically, a reference value may be set. In a case that the number of transmission layers or the number of ports for the orthogonal DMRS is greater than or equal to the reference value, the front-loaded DMRS of two OFDM symbols is configured, otherwise the front-loaded DMRS of one OFDM symbol is configured.

In the NR MIMO communication system, in a case that the SINR value of the user equipment is high, scheduling of multiple user transmission may be performed, that is, Multiple User (MU) MIMO transmission manner is adopted. Specifically, a threshold for communication quality may be defined. In a case that the communication quality of the user is higher than the threshold, the user may perform multi-user pairing with other users in a cell coverage area whose communication quality is higher than the threshold, to perform the MU MIMO transmission, otherwise Single User (SU) MIMO transmission is performed. The communication quality may be represented by, for example, a Channel Quality Indicator (CQI) fed back by the user. In other words, whether to perform the multi-user transmission scheduling on the user equipment may be determined based on the CQI of the user equipment.

In addition, whether to perform the MU MIMO transmission may be indicated by a redundant bit (for example, which is defined as MU_MIMO_TYPE) in Downlink Control Information (DCI). For example, in a case that MU_MIMO_TYPE is 1, it is indicated that the MU MIMO transmission is performed for a current user.

It should be noted that, in the case that the MU MIMO transmission is performed, the number of transmission layers based on which the first generation unit 101 generates the first indication is the total number of transmission layers of the paired users.

For example, there may be the following two patterns of the front-loaded DMRS. Practically, the pattern may be selected based on the maximum number of ports required for the DMRS.

In a first pattern, if the front-loaded DMRS occupies one OFDM symbol, the front-loaded DMRS is presented in a comb shape of 2+2CS, supporting up to four ports; and if the front-loaded DMRS occupies two OFDM symbols, the front-loaded DMRS is presented in a comb shape of 2+2CS+ time domain Orthogonal cover code (OCC) ({1, 1} and {1, –}, supporting up to eight ports.

In a second pattern, if the front-loaded DMRS occupies one OFDM symbol, the front-loaded DMRS is presented in a manner of 2-FD-OCC of cross-frequency domain (FD) adjacent REs, supporting up to six ports; and the front-loaded DMRS is presented in a manner of 2-FD-OCC of cross-frequency domain (FD) adjacent REs+time domain OCC ({1, 1} and {1, –1}), supporting up to twelve ports.

In addition, an additional DMRS may also be configured. For example, in a case that the user moves at a high speed, the additional DMRS may be used as a supplement to the front-loaded DMRS to provide support for correct demodulation. In an example, the second generation unit 102 may determine the configuration of the additional DMRS based on a moving speed of the user equipment.

For example, the moving speed of the user equipment may be determined based on the number of times of cell handover or the number of times of beam handover for the user equipment within a predetermined time period. In a case that the number of times of the handover is large, it is indicated that the user equipment is moving at a high speed, for example, moving at a speed higher than a predetermined speed threshold. In this case, an additional DMRS may need to be configured. Further, the moving speed may be estimated based on the specific number of times of the handover, to determine the specific configuration of the additional DMRS.

The configuration of the additional DMRS may include one or more of the following: whether to set the additional DMRS, the number of OFDM symbols which are occupied by the additional DMRS, a location of the OFDM symbols which are occupied by the additional DMRS, and a density of the additional DMRS. It should be understood that the configuration of the additional DMRS is not limited thereto, which may include other various aspects.

For ease of understanding, FIG. 2 to FIG. 5 respectively show schematic diagrams of examples of various DMRS configuration in a case that scheduling is performed based on a time slot of fourteen OFDM symbols.

Figure 2:
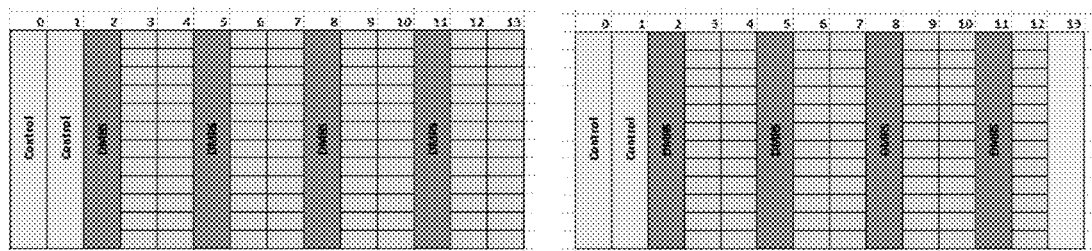
FIG. 2 is a diagram showing an example of a DMRS configuration.
Figure 2:
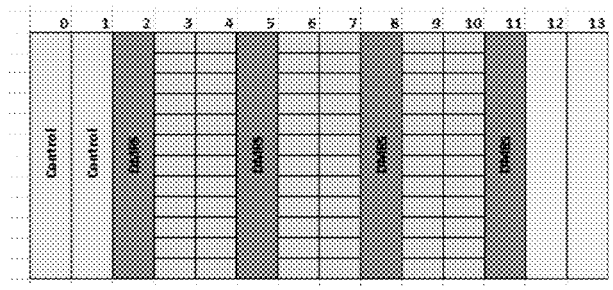

(a) to (c) of FIG. 2 show schematic diagrams of a DMRS configuration including a front-loaded DMRS of one OFDM symbol and an additional DMRS of three OFDM symbols. (a) to (c) of FIG. 2 respectively show three situations in which a Physical Downlink Shared Channel (PDSCH) occupies different number of OFDM symbols in a time slot. In FIG. 2, the front-loaded DMRS is located at a third OFDM symbol. First two OFDM symbols are used for control. The additional DMRS is located at a sixth OFDM symbol, a ninth OFDM symbol, and a twelfth OFDM symbol.

Figure 3:
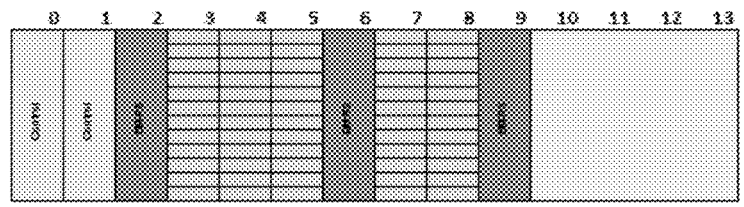
FIG. 3 is a diagram showing an example of a DMRS configuration.
Figure 3:
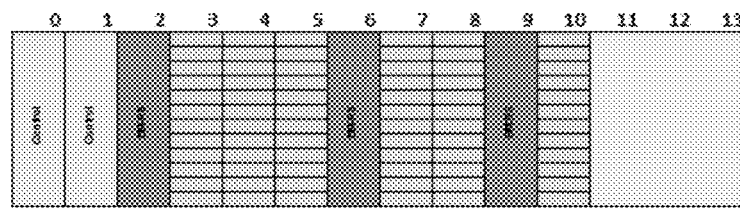
Figure 3:
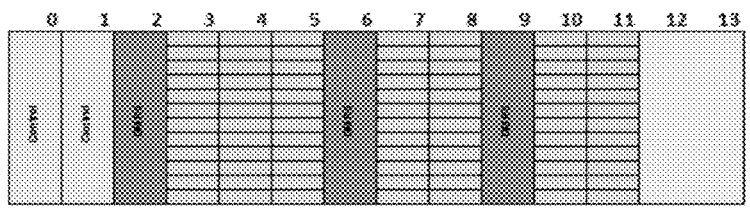
Figure 3:
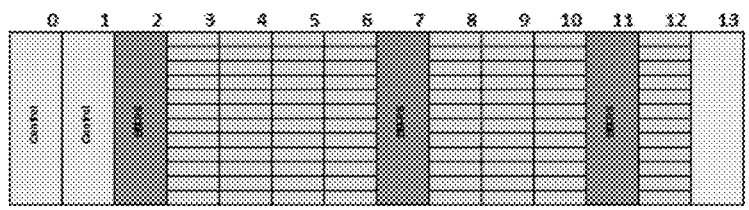
Figure 3:
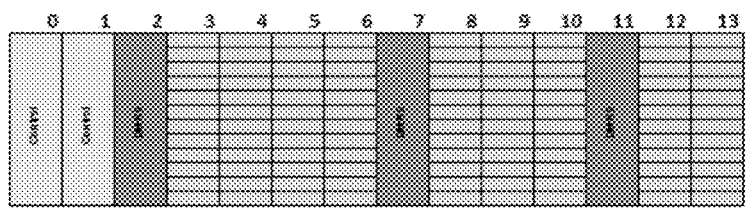

(a) to (e) of FIG. 3 show schematic diagrams of a DMRS configuration including a front-loaded DMRS of one OFDM symbol and an additional DMRS of two OFDM symbols. In (a) to (c) of FIG. 3, the PDSCH occupies different number of OFDM symbols in a time slot. The front-loaded DMRS is located at a third OFDM symbol, and first two OFDM symbols are used for control. The additional DMRS is located at a seventh OFDM symbol and a tenth OFDM symbol. In (d) and (e) of FIG. 3, the PDSCH occupies different number of OFDM symbols in a time slot, the location of the front-loaded DMRS is the same as that in (a) to (c) of FIG. 3, and the additional DMRS is located at an eighth OFDM symbol and a twelfth OFDM symbol.

Figure 4:
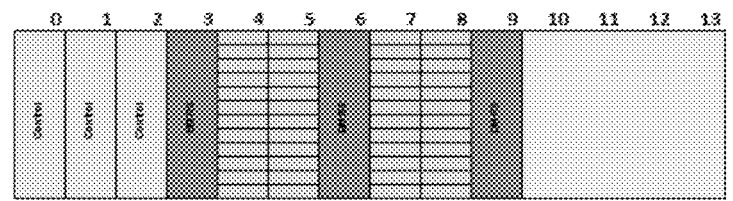
FIG. 4 is a diagram showing an example of a DMRS configuration.
Figure 4:
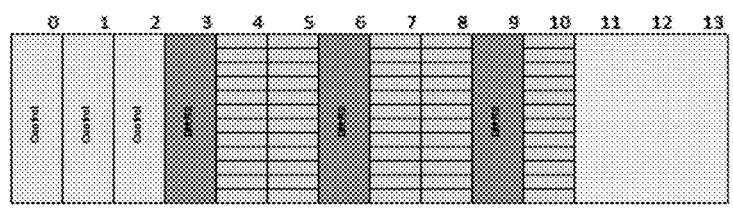
Figure 4:
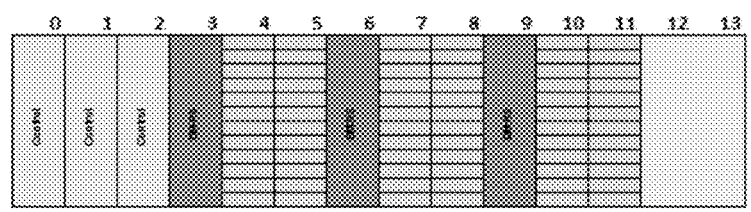
Figure 4:
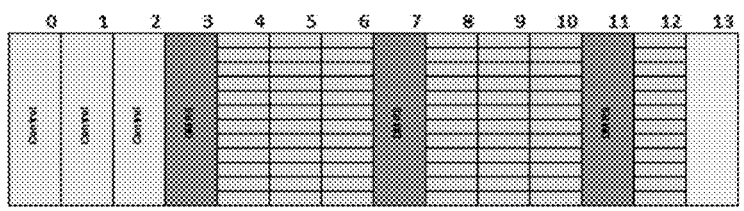
Figure 4:
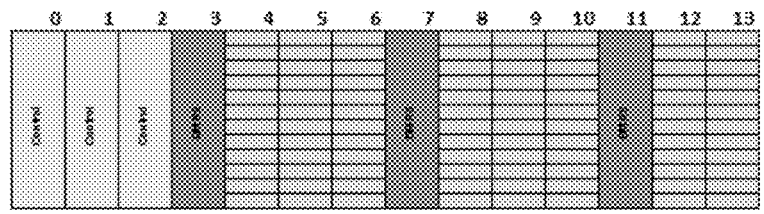

(a) to (e) of FIG. 4 show schematic diagrams of another DMRS configuration including a front-loaded DMRS of one OFDM symbol and an additional DMRS of two OFDM symbols. In (a) to (c) of FIG. 4, the PDSCH occupies different number of OFDM symbols in a time slot. The front-loaded DMRS is located at a fourth OFDM symbol, and first three OFDM symbols are used for control. The additional DMRS is located at a seventh OFDM symbol and a tenth OFDM symbol. In (d) and (e) of FIG. 4, the PDSCH occupies different number of OFDM symbols in a time slot., the location of the front-loaded DMRS is the same as that in (a) to (c) of FIG. 4, and the additional DMRS is located at an eighth OFDM symbol and a twelfth OFDM symbol.

Figure 5:
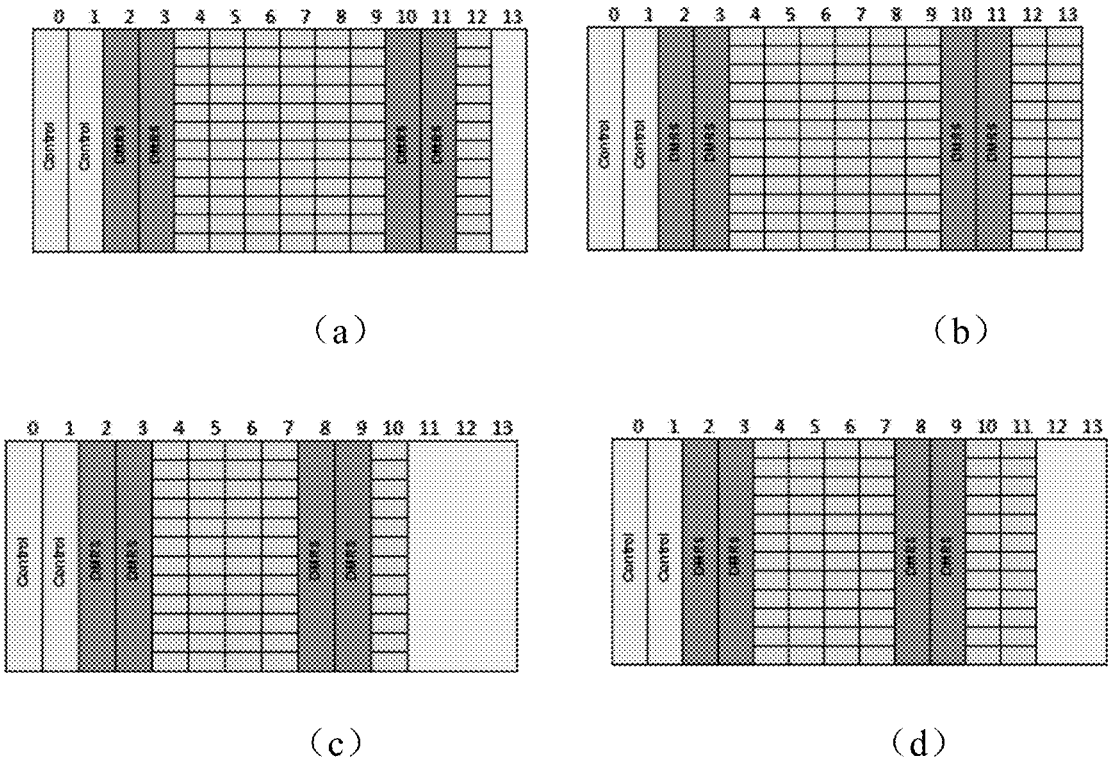
FIG. 5 is a diagram showing an example of a DMRS configuration.

(a) to (d) of FIGS. 5 show schematic diagrams of a DMRS configuration including a front-loaded DMRS of two OFDM symbols and an additional DMRS of two OFDM symbols. In FIG. 5, the front-loaded DMRS is located at a third OFDM symbol and a fourth OFDM symbol. The first two OFDM symbols are used for control. In (a) and (b) of FIG. 5, the PDSCH occupies different number of OFDM symbols in a time slot, and the additional DMRS is located at an eleventh OFDM symbol and a twelfth OFDM symbol. In (c) and (d) of FIG. 5, the PDSCH occupies different number of OFDM symbols in a time slot, and the additional DMRS is located at a ninth OFDM symbol and a tenth OFDM symbol. In addition, although not shown in FIG. 5, the front-loaded DMRS may also be located at the fourth OFDM symbol and the fifth OFDM symbol. In this case, the additional DMRS is located at the eleventh OFDM symbol and the twelfth OFDM symbols or at the ninth OFDM symbol and the tenth OFDM symbol. For example, whether the front-loaded DMRS starts from the third OFDM symbol or the fourth OFDM symbol depends on a length of the PDSCH.

In a case that the transmission is performed in a scheduling manner not based on a time slot, the number of scheduled OFDM symbols is not necessarily fourteen as described above, which may be less than or more than fourteen. For example, in the case of scheduling two or four OFDM symbols, the additional DMRS may not be configured. In the case of scheduling seven OFDM symbols, an additional DMRS of one OFDM symbol may be configured.

In an example, the number of OFDM symbols which are occupied by the additional DMRS is determined based on the first indication. For example, in a case that the DMRS configurations shown in FIG. 2 to FIG. 5 are adopted, the number of OFDM symbols which are occupied by the additional DMRS may be three or two if the front-loaded DMRS of one OFDM symbol is used; and the number of OFDM symbols which are occupied by the additional DMRS is two if the front-loaded DMRS of two OFDM symbols is used. It should be understood that the configuration of the additional DMRS depends on various factors, including but not limited to, the moving speed of the user equipment, the number of OFDM symbols which are occupied by the front-loaded DMRS, the scheduling manner or the like. Practically, the configuration of the additional DMRS may be determined by combining one or more of these factors.

After configurations of the front-loaded DMRS and the additional DMRS are determined, the third generation unit 103 determines a pattern of the DMRS based on the first indication and the second instruction respectively indicating the configurations, and generates a pattern index corresponding to the pattern. The pattern index is to be provided to the user equipment, such that the user equipment can know a location where the DMRS is to be received based on the pattern index.

The pattern of the DMRS indicates, for example, the configurations of the front-loaded DMRS and the additional DMRS. Specifically, the pattern of the DMRS may indicate: the number and a location of OFDM symbols which are occupied by the front-loaded DMRS, whether to set the additional DMRS, the number and a location of OFDM symbols which are occupied by the additional DMRS, a density of the additional DMRS, or the like.

Accordingly, the electronic apparatus 100 may further include a communication unit (which is not shown in FIG. 1) configured to perform various transceiving operations. The communication unit may be implemented as, for example, an antenna, or an antenna array, or circuit elements associated therewith.

In an example, the third generation unit 103 may contain the pattern index in Downlink Control Information (DCI) to be provided to the user equipment. For example, an existing DCI format 0 may be modified to represent the pattern index by using redundant bits therein. The number of bits occupied by the pattern index is dependent on, for example, the number of patterns of DMRS which can be configured for the user equipment. It is assumed that L represents the total number of patterns of DMRS that can be configured, K bits are required to indicate the pattern index, where K=$\lceil \log_2 L \rceil$.

In addition, in order to reduce the total number of patterns of the DMRS to reduce the signaling overhead, various designs may be made for the format of the pattern index.

For example, the pattern index may include two parts, where one part indicates the configuration of the front-loaded DMRS, and the other part indicates the number of OFDM symbols by which the additional DMRS is offset relative to the front-loaded DMRS. As shown in the following formula (1), $$l' = l + \textit{offest}, \text{ where } \textit{offest} = \begin{Bmatrix} 0 \\ 1 \\ 2 \\ 3 \end{Bmatrix} \quad (1)$$

where offset represents the number of OFDM symbols by which the additional DMRS is offset relative to the front-loaded DMRS. In a case that offset is 0, it is indicated that no additional DMRS is set. In a case that offset is 1, it is indicated that an additional DMRS is set at a position which is offset by one (or another predetermined number) OFDM symbol relative to the front-loaded DMRS, and so on. The value of Offset may depend on, for example, the moving speed of the user equipment.

In another example, the third generation unit 103 further contains the first indication in a Radio Resource Control (RRC) signaling to be provided to the user equipment, such that the user equipment determines the pattern of the DMRS by combining the first indication and the pattern index.

For example, one bit information element DMRS_OFDM may be added in the RRC signaling to represent the first indication. In a case that DMRS_OFDM is 1, it is indicated that the number of the OFDM symbols which are occupied by the front-loaded DMRS is one. In a case that DMRS_OFDM is 0, it is indicated that the number of the OFDM symbols which are occupied by the front-loaded DMRS is two. It should be understood that the value of DMRS_OFDM is not limited thereto, which is only an example. For example, the value of DMRS_OFDM may be defined in an opposite manner to the above, or the like.

In this way, the pattern index is only required to indicate various patterns of the DMRS that may be adopted in the case of the front-loaded DMRS adopting a specific number of OFDM symbols, that is, the pattern index is only required to indicate a subset of all patterns of the DMRS. Therefore, the total number of patterns to be indicated is greatly reduced, so that the number of bits occupied by the pattern index can be greatly reduced, thereby reducing the signaling overhead.

In the existing LTE, a mapping relationship between an antenna port of a DMRS and REs in a physical resource block is calculated by a fixed algorithm. In the NR MIMO, the mapping relationship may also be similarly determined by a fixed algorithm. As described above, since there may be multiple patterns of the DMRS in the NR MIMO, the pattern index of the DMRS may also be taken into consideration as a parameter in the calculation.

In addition, as mentioned above, the DMRS may include two parts, i.e., the front-loaded DMRS and the additional DMRS. The configuration of the additional DMRS is determined based on the number of OFDM symbols by which the additional DMRS is offset relative to the front-loaded DMRS. In this case, mapping from the front-loaded DMRS to the REs may be performed by a fixed algorithm, and mapping from the additional DMRS to the REs is obtained by means of an offset value.

Alternatively, multiple mapping algorithms from the DMRS to the REs may be set. The base station provides a number of the mapping algorithm to the user equipment via a DCI signaling, such that the user equipment can select an appropriate mapping algorithm.

In order to improve the data transmission efficiency, idle REs within the OFDM symbols for the DMRS which are not occupied by the DMRS may be used for data transmission. Of course, the transmission should be performed without affecting the demodulation performance. Therefore, the status of the idle REs needs to be determined.

Figure 6:
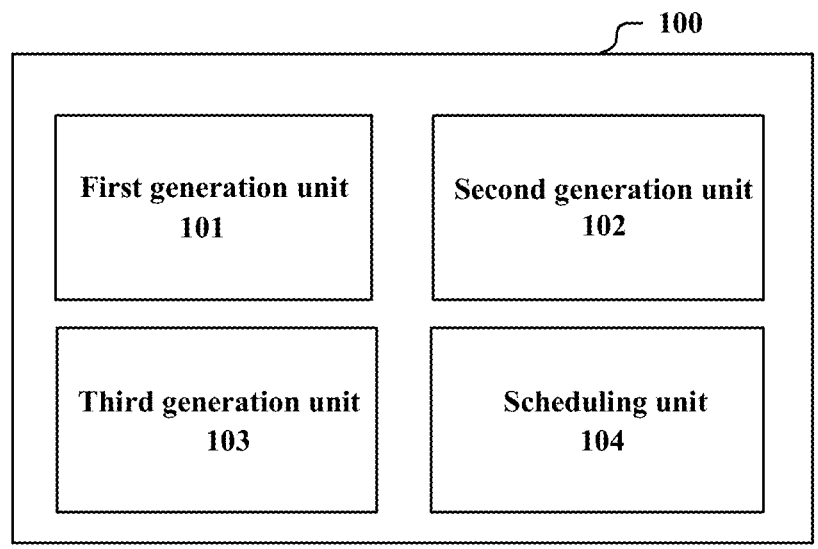
FIG. 6 is a functional block diagram showing an electronic apparatus for wireless communications according to an embodiment of the present disclosure.

FIG. 6 shows another functional block diagram of the electronic apparatus 100. In addition to the components shown in FIG. 1, the electronic apparatus 100 further includes a scheduling unit 104. The scheduling unit 104 is configured to determine, based on the number of REs within the OFDM symbols for the DMRS which are not occupied by the DMRS, whether to use these unoccupied REs for data transmission.

Similarly, the scheduling unit 104 may be implemented by one or more processing circuits, which may be implemented as a chip, for example.

For example, the scheduling unit 104 is configured to: compare the number of the unoccupied REs with a predetermined threshold; in a case that the number is greater than the predetermined threshold, determine to use the unoccupied REs for data transmission; and in a case that the number is smaller than the predetermined threshold, determine to use the unoccupied REs for power boosting of the DMRS.

In order to determine which REs are not occupied, the scheduling unit 104 may create a bitmap of port usage conditions of the DMRS. In a case that a certain bit in the bitmap is 1, it is indicated that the RE corresponding to a corresponding port is occupied by the DMRS; otherwise it is indicated that the RE is not occupied by the DMRS. In a case that the number of REs corresponding to antenna ports whose bits in the bitmap being 0 is greater than a predetermined threshold, it is determined to use these REs for data transmission. Otherwise, these REs are used for power boosting of the DMRS.

As mentioned above, there are two transmission cases, i.e., the SU MIMO transmission and the MU MIMO transmission. In the case of the SU MIMO transmission, the scheduling unit 104 may further create a correspondence table of the pattern index of the DMRS with the number of REs within the OFDM symbols for the DMRS which are not occupied by the DMRS. The correspondence table is transparent to the base station and the user equipment, such that whether the number of REs not occupied by the DMRS is greater than the predetermined threshold can be easily determined, and further it is determined whether to use these REs for data transmission or for power boosting of the DMRS.

In addition, in the case of the MU MIMO transmission, the scheduling unit 104 further provides port usage conditions of the DMRS of paired user equipment to the user equipment. In this way, in a process that the user equipment uses the idle REs for data transmission, the REs corresponding to the port of the DMRS of the paired user equipment can be prevented from being used, thereby avoiding causing interference.

The scheduling unit 104 is further configured to generate signaling for instructing the user equipment to use the unoccupied REs for data transmission, and contain the signaling in the DCI. For example, a signaling Close_Data_Transmission containing one bit may be defined. Specifically, for example, in a case that the base station transmits Close_Data_Transmission=1 to the user, it is indicated that the user equipment will use the idle REs for power boosting. In a case that the base station transmits Close_Data_Transmission=0 to the user, it is indicated that the user equipment will use the idle REs for data transmission.

The scheduling unit 104 may be further configured to acquire, from the user equipment, a response to the signaling by the user equipment. For example, after receiving the signaling for instructing to use the idle REs for data transmission, the user equipment compares an SINR value thereof with a predetermined threshold Threshold_SINR_MIN. In a case that the SINR of the user equipment is lower than Threshold_SINR_MIN in a current scheduling period, the user equipment feeds back one bit signaling of UE_Response=0 as a response to the signaling to the base station, to indicate that the user equipment does not accept the instruction of the base station and stops using the REs within the OFDM symbols which are not occupied by the DMRS for data transmission. In addition, in a case that the SINR of the user equipment is higher than Threshold_SINR_MIN in the current scheduling period, the user equipment feeds back UE_Response=1 as a response to the signaling to the base station, to indicate that the user equipment accepts the instruction of the base station and will use the REs within the OFDM symbols which are not occupied by the DMRS for data transmission. The UE_Response may be defined in an opposite manner to the above. That is, in the case of UE_Response=1, it is indicated that the user equipment accepts the instruction of the base station, and in the case of UE_Response=0, it is indicated that the user equipment does not accept the instruction of the base station.

In addition, the UE_Response fed back by the user equipment to the base station may also be used as a response to a signaling for instructing to use the REs within the OFDM symbols which are not occupied by the DMRS for power boosting.

It should be understood that the configuration of the DMRS given above may be applied to both the DL DMRS and the UL DMRS. In a case that both uplink transmission and downlink transmission are included in a time slot, a guard interval of an OFDM symbol is required between the uplink transmission and the downlink transmission.

With the electronic apparatus 100 according to this embodiment, different DMRSs can be configured to meet requirements of different scenarios, improving the flexibility of the DMRS configuration. In addition, signaling overhead is reduced by appropriate signaling settings, and data transmission efficiency is improved by using the unoccupied REs within the OFDM symbols for the DMRS for data transmission under appropriate conditions.

Second Embodiment

Figure 7:
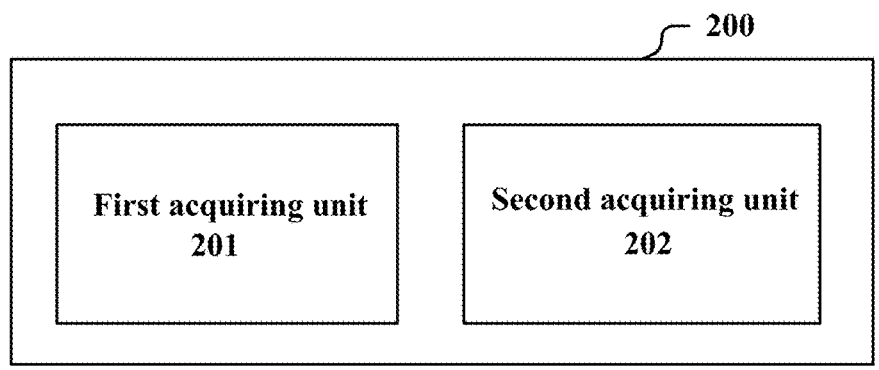
FIG. 7 is a functional block diagram showing an electronic apparatus for wireless communications according to another embodiment of the present disclosure.

FIG. 7 shows a functional block diagram of an electronic apparatus 200 for wireless communications according to another embodiment of the present disclosure. As shown in FIG. 7, the electronic apparatus 200 includes a first acquiring unit 201, and a second acquiring unit 202. The first acquiring unit 201 is configured to acquire, from a base station, a pattern index indicating a pattern of a DMRS. The pattern of the DMRS indicates: the number and a location of OFDM symbols which are occupied by a front-loaded DMRS, and a configuration of an additional DMRS. The second acquiring unit 202 is configured to acquire the DMRS based on the pattern indicated by the pattern index.

The first acquiring unit 201 and the second acquiring unit 202 may be implemented by one or more processing circuits, which may be implemented as chips, for example. The electronic apparatus 200 may, for example, be located at or communicatively connected to a network node side, such as user equipment side.

The configuration of the additional DMRS may include one or more of the following: whether to set the additional DMRS, the number of OFDM symbols which are occupied by the additional DMRS, a location of the OFDM symbols which are occupied by the additional DMRS, and a density of the additional DMRS. It should be understood that the configuration of the additional DMRS is not limited thereto, which may include other various aspects.

In an example, the first acquiring unit 201 may be configured to acquire the pattern index via DCI. The pattern index may be contained in the DCI in a similar manner as that in the first embodiment, which is not repeated herein.

Accordingly, the electronic apparatus 200 may further include a communication unit (which is not shown in FIG.

7) configured to perform corresponding transceiving operations. The communication unit may be implemented as, for example, an antenna, or an antenna array, or circuit elements associated therewith.

In another example, the pattern index may include two portions. The first acquiring unit 201 is configured to acquire a first portion of the pattern index via a RRC signaling and acquire a second portion of the pattern index via DCI. The first portion indicates the number of OFDM symbols occupied by the front-loaded DMRS. The second portion indicates the location of the OFDM symbols occupied by the front-loaded DMRS and/or the configuration of the additional DMRS. In this case, the first portion of the pattern index is used to define a subset of all DMRS patterns which can be applied to the user equipment, and the second portion of the pattern index is used to define a specific DMRS pattern in the subset. A specific example thereof has been described in detail in the first embodiment, which is not repeated herein.

In addition, the second portion of the pattern index may further include the number of OFDM symbols by which the additional DMRS is offset relative to the front-loaded DMRS. In this case, the configuration of the additional DMRS is determined by referring to the configuration of the front-loaded DMRS. The second portion of the pattern index may optionally include the location of the OFDM symbols occupied by the front-loaded DMRS. In this way, by combining the first portion and the second portion of the pattern index, the specific configuration of the DMRS can be determined. Further, the offset may also be used in the process of mapping from the antenna ports of the DMRS to the REs, as described in the first embodiment.

After the specific configuration of the DMRS is determined by the pattern index, the user equipment where the electronic apparatus 200 is located acquires the DMRS based on the configuration and performs a demodulation operation.

In addition, the first acquiring unit 201 is further configured to acquire, from the base station, an instruction indicating whether to use the REs in the OFDM symbols for the DMRS which are not occupied by the DMRS for data transmission or for power boosting of the DMRS. The instruction is received via, for example, DCI.

Figure 8:
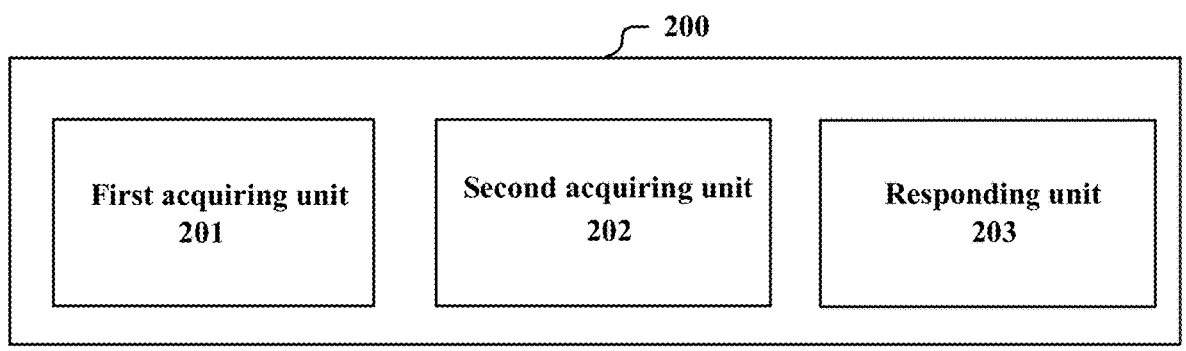
FIG. 8 is a functional block diagram showing an electronic apparatus for wireless communications according to another embodiment of the present disclosure.

FIG. 8 shows another functional block diagram of the electronic apparatus 200. In addition to the components shown in FIG. 7, the electronic apparatus 200 further includes a responding unit 203. The responding unit 203 is configured to generate a response to the above mentioned instruction. The response indicates whether the user equipment accepts the instruction of the base station, which may be represented by, for example, one bit signaling UE_Response.

In an example, the responding unit 203 is configured to generate the response according to the SINR of the user equipment where the electronic apparatus 200 is located. For example, after receiving the instruction from the base station for instructing to use the idle REs for data transmission, the responding unit 203 compares the SINR value of the user equipment with a predetermined threshold Threshold_SINR_MIN. In a case that the SINR of the user equipment is lower than the Threshold_SINR_MIN in a current scheduling period, the responding unit 203 generates a signaling of UE_Response=0 as a response to the above mentioned instruction, to indicate that the user equipment does not accept the instruction of the base station and stops using the REs within the OFDM symbols which are not occupied by the DMRS for data transmission. On the other hand, in a case that the SINR of the user equipment is higher than Threshold_SINR_MIN in the current scheduling period, the responding unit 203 generates a signaling of UE_Response=1 as a response to the above mentioned instruction, to indicate that the user equipment accepts the instruction of the base station and will use the REs within the OFDM symbols which are not occupied by the DMRS for data transmission.

Similarly, the responding unit 203 may generate a response to the signaling from the base station indicating whether to use the REs in the OFDM symbols which are not occupied by the DMRS for power boosting.

As described in the first embodiment, the base station side may create a bitmap of port usage conditions of the DMRS. In a case that a certain bit in the bitmap is 1, it is indicated that the RE corresponding to a corresponding port is occupied by the DMRS; otherwise it is indicated that the RE is not occupied by the DMRS. In the case of the MU MIMO transmission, if the REs not occupied by the DMRS are to be used for data transmission, the first acquiring unit 201 may further acquire, from the base station, the port usage conditions of the DMRS of paired user equipment, to avoid causing interference.

In the case of the SU MIMO transmission, the base station may further create a correspondence table of the pattern index of the DMRS with the number of REs within the OFDM symbols for the DMRS which are not occupied by the DMRS. The correspondence table is also transparent to the user equipment, such that the user equipment can easily use these REs for data transmission.

In summary, with the electronic apparatus 200 according to this embodiment, the DMRS configuration can be determined by acquiring a pattern index, improving the flexibility of the DMRS configuration. Further, data transmission efficiency can be improved by using the REs within the OFDM symbols for the DMRS which are not occupied by the DMRS for data transmission.

Fifth Embodiment

In the process of describing the electronic apparatus for wireless communications in the embodiments described above, obviously, some processing and methods are also disclosed. Hereinafter, an overview of the methods is given without repeating some details disclosed above. However, it should be noted that, although the methods are disclosed in a process of describing the electronic apparatus for wireless communications, the methods do not certainly employ or are not certainly executed by the aforementioned components. For example, the embodiments of the electronic apparatus for wireless communications may be partially or completely implemented with hardware and/or firmware, the methods for wireless communications described below may be executed by a computer-executable program completely, although the hardware and/or firmware of the electronic apparatus for wireless communications can also be used in the methods.

Figure 9:
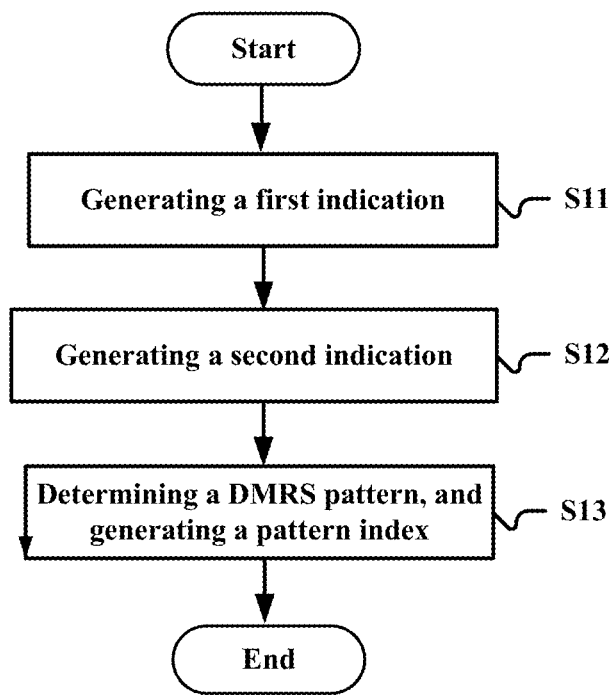
FIG. 9 is a flowchart showing a method for wireless communications according to an embodiment of the present disclosure.

FIG. 9 is a flowchart showing a method for wireless communications according to an embodiment of the present disclosure. As shown in FIG. 9, the method includes: generating a first instruction indicating the number of OFDM symbols which are occupied by a front-loaded DMRS (S11); generating a second instruction indicating a configuration of an additional DMRS (S12); and determining a pattern of a DMRS based on the first indication and the second indication, and generating a pattern index corresponding to the pattern to be provided to user equipment (S13).

For example, in step S11, the first indication may be generated based on the number of transmission layers or the number of ports for an orthogonal DMRS. In step S12, the configuration of the additional DMRS may be determined based on a moving speed of the user equipment. The moving speed of the user equipment may be determined based on the number of times of cell handover or the number of times of beam handover for the user equipment within a predetermined time period.

The configuration of the additional DMRS may include one or more of the following: whether to set the additional DMRS, the number of OFDM symbols which are occupied by the additional DMRS, a location of the OFDM symbols which are occupied by the additional DMRS, a density of the additional DMRS, and the like. In an example, the number of the OFDM symbols which are occupied by the additional DMRS may be determined based on the first indication.

For example, the pattern index may be contained in DCI to be provided to the user equipment. The number of bits occupied by the pattern index is dependent on the number of patterns of DMRS which can be configured for the user equipment. In an example, the pattern index may further include the number of OFDM symbols by which the additional DMRS is offset relative to the front-loaded DMRS.

In another example, the first indication may be contained in a RRC signaling to be provided to the user equipment, such that the user equipment determines the pattern of the DMRS by combining the first indication and the pattern index.

For example, one bit information element DMRS_OFDM may be added in the RRC signaling to represent the first indication. In a case that DMRS_OFDM is 1, it is indicated that the number of the OFDM symbols which are occupied by the front-loaded DMRS is one. In a case that DMRS_OFDM is 0, it is indicated that the number of the OFDM symbols which are occupied by the front-loaded DMRS is two.

In addition, the above method may further include determining, based on a channel quality indicator of the user equipment, whether to perform scheduling of multiple user transmission on the user equipment. The instruction on whether to perform multiple user transmission may also be contained in the DCI to be transmitted to the user equipment.

Although not shown in FIG. 9, the above method may further include the step of determining, based on the number of REs within the OFDM symbols for the DMRS which are not occupied by the DMRS, whether to use these unoccupied REs for data transmission. For example, the number of the unoccupied REs may be compared with a predetermined threshold. In a case that the number is greater than the predetermined threshold, it is determined that the unoccupied resource units are to be used for data transmission. In a case that the number is less than the predetermined threshold, it is determined that the unoccupied resource units are to be used for power boosting of the DMRS.

A signaling for instructing the user equipment to use the unoccupied REs for data transmission may further be generated to be contained in the DCI. After the user equipment acquires the signaling from the DCI, the user equipment generates a response to the signaling. The above method further includes acquiring the response from the user equipment.

In addition, in order to obtain the number of the REs within the OFDM symbols for the DMRS which are not occupied by the DMRS, a bitmap of port usage conditions of the DMRS may be created. For the case of the multiple user transmission, if it is determined that the unoccupied REs are to be used for data transmission, port usage conditions of the DMRS of the paired user equipment may be provided to the user equipment to avoid causing interference.

For the case of the single user transmission, a correspondence table of the pattern index of the DMRS with the number of REs within the OFDM symbols for the DMRS which are not occupied by the DMRS signal may be created. The correspondence table is shared by the base station and the user equipment.

With the method according to this embodiment, different DMRSs can be configured to meet requirements of different scenarios, improving the flexibility of the DMRS configuration. In addition, signaling overhead is reduced by appropriate signaling settings, and data transmission efficiency is improved by using the unoccupied REs within the OFDM symbols for the DMRS for data transmission under appropriate conditions.

Figure 10:
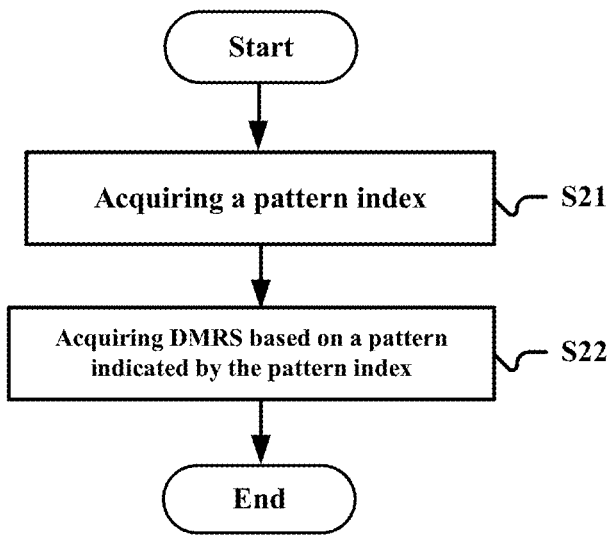
FIG. 10 is a flowchart showing a method for wireless communications according to another embodiment of the present disclosure.

FIG. 10 is a flowchart showing a method for wireless communications according to another embodiment of the present disclosure. As shown in FIG. 10, the method includes: acquiring, from a base station, a pattern index indicating a pattern of a DMRS (S21), where the pattern of the DMRS indicates: the number and a location of OFDM symbols which are occupied by a front-loaded DMRS, and a configuration of an additional DMRS; and acquiring the DMRS based on the pattern indicated by the pattern index (S22).

In step S21, the pattern index may be acquired via DCI.

Alternatively, in step S21, a first portion of the pattern index may be acquired via a RRC signaling and a second portion of the pattern index may be acquired via DCI. The first portion indicates the number of OFDM symbols occupied by the front-loaded DMRS. The second portion indicates the location of the OFDM symbols occupied by the front-loaded DMRS and/or the configuration of the additional DMRS. In an example, the second portion may include the number of OFDM symbols by which the additional DMRS is offset relative to the front-loaded DMRS.

In addition, although not shown in FIG. 10, the above method may further include: acquiring, from the base station, an instruction indicating whether to use REs in the OFDM symbols for the DMRS which are not occupied by the DMRS for data transmission or for power boosting of the DMRS. In addition, the method may further include the step of generating a response to the instruction. For example, the response may be generated according to an SINR of the user equipment where the electronic apparatus is located.

With the method according to this embodiment, the DMRS configuration can be determined by acquiring a pattern index, improving the flexibility of the DMRS configuration. Further, data transmission efficiency is improved by using the REs within the OFDM symbols for the DMRS which are not occupied by the DMRS for data transmission.

It should be noted that, the details of the above methods are described in the first to the second embodiments, which are not repeated herein.

The technology of the present disclosure may be applied to various products. The base station describe above may be implemented as any type of evolution Node B (eNB) or gNB (which is a 5G base station). The eNB includes, for example, a macro eNB and a small eNB. The small eNB may be an eNB covering a cell smaller than a macro cell, such as a pico eNB, a micro eNB and a home (femto) eNB. The case for the gNB is similar to the above. Alternatively, the base station may be implemented as any other type of base station, such as a NodeB and a base transceiver station (BTS). The base station may include a main body (that is also referred to as a base station apparatus) configured to control radio communication, and one or more remote radio heads (RRH) disposed in a different place from the main body. In addition, various types of user equipments may each operate as the base station by temporarily or semi-persistently executing a base station function.

The above-mentioned user equipment may be implemented as a mobile terminal (such as a smartphone, a tablet personal computer (PC), a notebook PC, a portable game terminal, a portable/dongle mobile router, and a digital camera device) or an in-vehicle terminal such as a car navigation apparatus. The user equipment may also be implemented as a terminal (also referred to as a machine type communication (MTC) terminal) that performs machine-to-machine (M2M) communication. In addition, the user equipment may be a wireless communication module (such as an integrated circuit module including a single chip) mounted on each of the terminals described above.

APPLICATION EXAMPLE REGARDING BASE STATION

First Application Example

Figure 11:
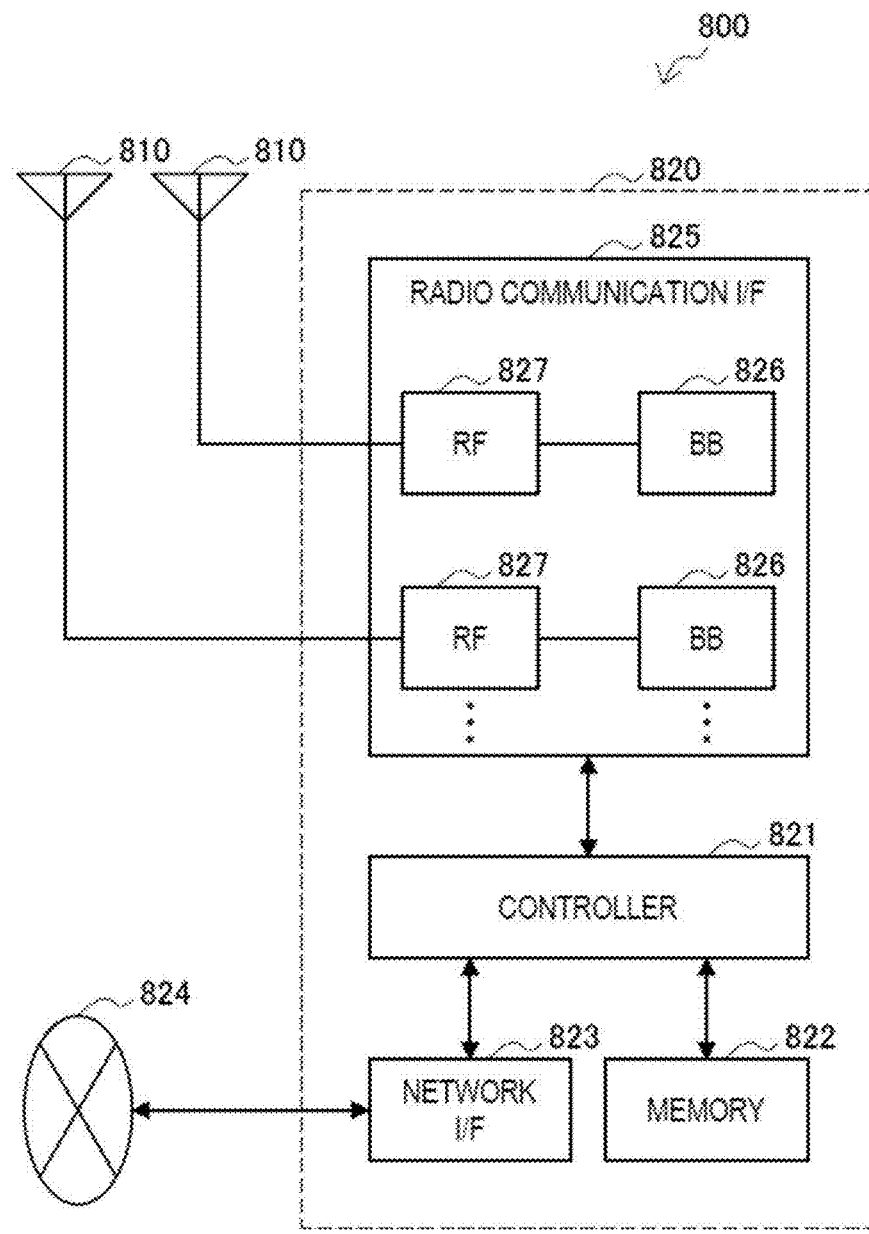
FIG. 11 is a block diagram showing a first example of a schematic configuration of an eNB or a gNB to which the technology of the present disclosure may be applied.

FIG. 11 is a block diagram illustrating a first example of a schematic configuration of an eNB or a gNB to which the technology of the present disclosure may be applied. It should be noted that the following description is given by taking the eNB as an example, which is also applicable to the gNB. An eNB 800 includes one or more antennas 810 and a base station apparatus 820. The base station apparatus 820 and each of the antennas 810 may be connected to each other via a radio frequency (RF) cable.

Each of the antennas 810 includes a single or multiple antennal elements (such as multiple antenna elements included in a multiple-input multiple-output (MIMO) antenna), and is used for the base station apparatus 820 to transmit and receive wireless signals. As shown in FIG. 11, the eNB 800 may include the multiple antennas 810. For example, the multiple antennas 810 may be compatible with multiple frequency bands used by the eNB 800. Although FIG. 11 shows the example in which the eNB 800 includes the multiple antennas 810, the eNB 800 may also include a single antenna 810.

The base station apparatus 820 includes a controller 821, a memory 822, a network interface 823, and a radio communication interface 825.

The controller 821 may be, for example, a CPU or a DSP, and operates various functions of a higher layer of the base station apparatus 820. For example, the controller 821 generates a data packet from data in signals processed by the radio communication interface 825, and transfers the generated packet via the network interface 823. The controller 821 may bundle data from multiple base band processors to generate the bundled packet, and transfer the generated bundled packet. The controller 821 may have logical functions of performing control such as radio resource control, radio bearer control, mobility management, admission control and scheduling. The control may be performed in corporation with an eNB or a core network node in the vicinity. The memory 822 includes a RAM and a ROM, and stores a program executed by the controller 821 and various types of control data (such as terminal list, transmission power data and scheduling data).

The network interface 823 is a communication interface for connecting the base station apparatus 820 to a core network 824. The controller 821 may communicate with a core network node or another eNB via the network interface 823. In this case, the eNB 800, and the core network node or another eNB may be connected to each other via a logic interface (such as an S1 interface and an X2 interface). The network interface 823 may also be a wired communication interface or a wireless communication interface for wireless backhaul. If the network interface 823 is a wireless communication interface, the network interface 823 may use a higher frequency band for wireless communication than that used by the radio communication interface 825.

The radio communication interface 825 supports any cellular communication scheme (such as Long Term Evolution (LTE) and LTE-advanced), and provides wireless connection to a terminal located in a cell of the eNB 800 via the antenna 810. The radio communication interface 825 may typically include, for example, a baseband (BB) processor 826 and an RF circuit 827. The BB processor 826 may perform, for example, encoding/decoding, modulating/demodulating, and multiplexing/demultiplexing, and performs various types of signal processing of layers (such as L1, Media Access Control (MAC), Radio Link Control (RLC), and a Packet Data Convergence Protocol (PDCP)). The BB processor 826 may have a part or all of the above-described logical functions instead of the controller 821. The BB processor 826 may be a memory storing communication control programs, or a module including a processor and a related circuit configured to execute the programs. Updating the program may allow the functions of the BB processor 826 to be changed. The module may be a card or a blade that is inserted into a slot of the base station apparatus 820. Alternatively, the module may also be a chip that is mounted on the card or the blade. Meanwhile, the RF circuit 827 may include, for example, a mixer, a filter, and an amplifier, and transmits and receives wireless signals via the antenna 810.

As show in FIG. 11, the radio communication interface 825 may include the multiple BB processors 826. For example, the multiple BB processors 826 may be compatible with multiple frequency bands used by the eNB 800. The radio communication interface 825 may include multiple RF circuits 827, as shown in FIG. 11. For example, the multiple RF circuits 827 may be compatible with multiple antenna elements. Although FIG. 11 shows the example in which the radio communication interface 825 includes the multiple BB processors 826 and the multiple RF circuits 827, the radio communication interface 825 may also include a single BB processor 826 and a single RF circuit 827.

In the eNB 800 shown in FIG. 11, the transceiving unit of the electronic apparatus 100 may be implemented by the radio communication interface 825. At least a part of the functions may also be implemented by the controller 821. For example, the controller 821 may perform the generation of the pattern index by performing the functions of the first generation unit 101, the second generation unit 102, and the third generation unit 103, and may also instruct the user equipment to use the REs in the OFDM symbols for the DMRS which are not occupied by the DMRS for data transmission or power boosting by performing the function of the scheduling unit 104.

Second Application Example

Figure 12:
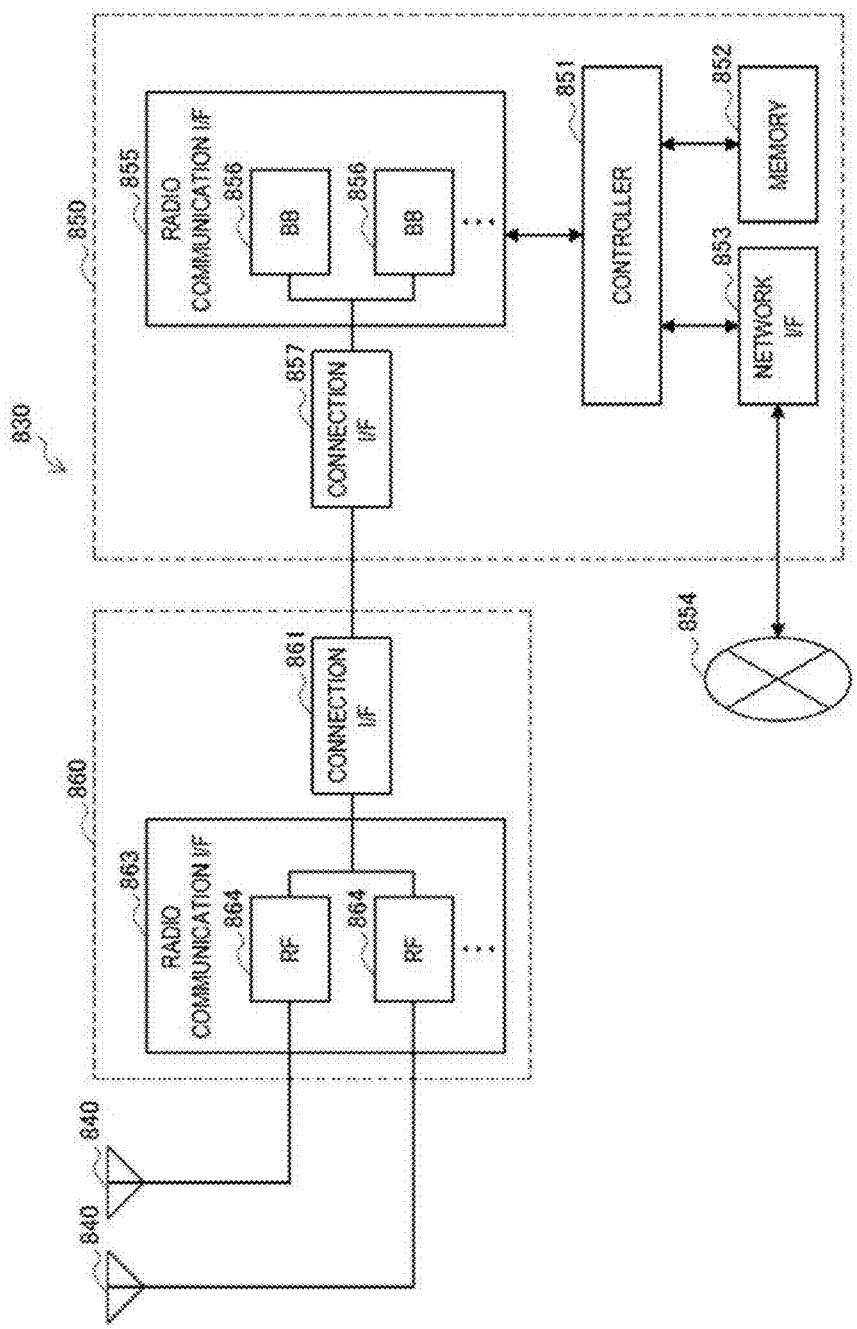
FIG. 12 is a block diagram showing a second example of a schematic configuration of an eNB or a gNB to which the technology of the present disclosure may be applied.

FIG. 12 is a block diagram illustrating a second example of a schematic configuration of an eNB or a gNB to which the technology according to the present disclosure may be applied. It should be noted that the following description is given by taking the eNB as an example, which is also applied to the gNB. An eNB 830 includes one or more antennas 840, a base station apparatus 850, and an RRH 860. The RRH 860 and each of the antennas 840 may be connected to each other via an RF cable. The base station apparatus 850 and the RRH 860 may be connected to each other via a high speed line such as an optical fiber cable.

Each of the antennas 840 includes a single or multiple antennal elements (such as multiple antenna elements included in an MIMO antenna), and is used for the RRH 860 to transmit and receive wireless signals. As shown in FIG. 12, the eNB 830 may include the multiple antennas 840. For example, the multiple antennas 840 may be compatible with multiple frequency bands used by the eNB 830. Although FIG. 12 shows the example in which the eNB 830 includes the multiple antennas 840, the eNB 830 may also include a single antenna 840.

The base station apparatus 850 includes a controller 851, a memory 852, a network interface 853, a radio communication interface 855, and a connection interface 857. The controller 851, the memory 852, and the network interface 853 are the same as the controller 821, the memory 822, and the network interface 823 described with reference to FIG. 11.

The radio communication interface 855 supports any cellular communication scheme (such as LTE and LTE-advanced), and provides wireless communication to a terminal located in a sector corresponding to the RRH 860 via the RRH 860 and the antenna 840. The radio communication interface 855 may typically include, for example, a BB processor 856. The BB processor 856 is the same as the BB processor 826 described with reference to FIG. 11, except that the BB processor 856 is connected to an RF circuit 864 of the RRH 860 via the connection interface 857. As show in FIG. 12, the radio communication interface 855 may include the multiple BB processors 856. For example, the multiple BB processors 856 may be compatible with multiple frequency bands used by the eNB 830. Although FIG. 12 shows the example in which the radio communication interface 855 includes the multiple BB processors 856, the radio communication interface 855 may also include a single BB processor 856.

The connection interface 857 is an interface for connecting the base station apparatus 850 (radio communication interface 855) to the RRH 860. The connection interface 857 may also be a communication module for communication in the above-described high speed line that connects the base station apparatus 850 (radio communication interface 855) to the RRH 860.

The RRH 860 includes a connection interface 861 and a radio communication interface 863.

The connection interface 861 is an interface for connecting the RRH 860 (radio communication interface 863) to the base station apparatus 850. The connection interface 861 may also be a communication module for communication in the above-described high speed line.

The radio communication interface 863 transmits and receives wireless signals via the antenna 840. The radio communication interface 863 may typically include, for example, the RF circuit 864. The RF circuit 864 may include, for example, a mixer, a filter and an amplifier, and transmits and receives wireless signals via the antenna 840. The radio communication interface 863 may include multiple RF circuits 864, as shown in FIG. 12. For example, the multiple RF circuits 864 may support multiple antenna elements. Although FIG. 12 shows the example in which the radio communication interface 863 includes the multiple RF circuits 864, the radio communication interface 863 may also include a single RF circuit 864.

In the eNB 830 shown in FIG. 12, the transceiving unit of the electronic apparatus 100 may be implemented by the radio communication interface 825. At least a part of the functions may also be implemented by the controller 821. For example, the controller 821 may perform the generation of the pattern index by performing the functions of the first generation unit 101, the second generation unit 102, and the third generation unit 103, and may also instruct the user equipment to use the REs in the OFDM symbols for the DMRS which are not occupied by the DMRS for data transmission or power boosting by performing the function of the scheduling unit 104.

APPLICATION EXAMPLE REGARDING USER EQUIPMENT

First Application Example

Figure 13:
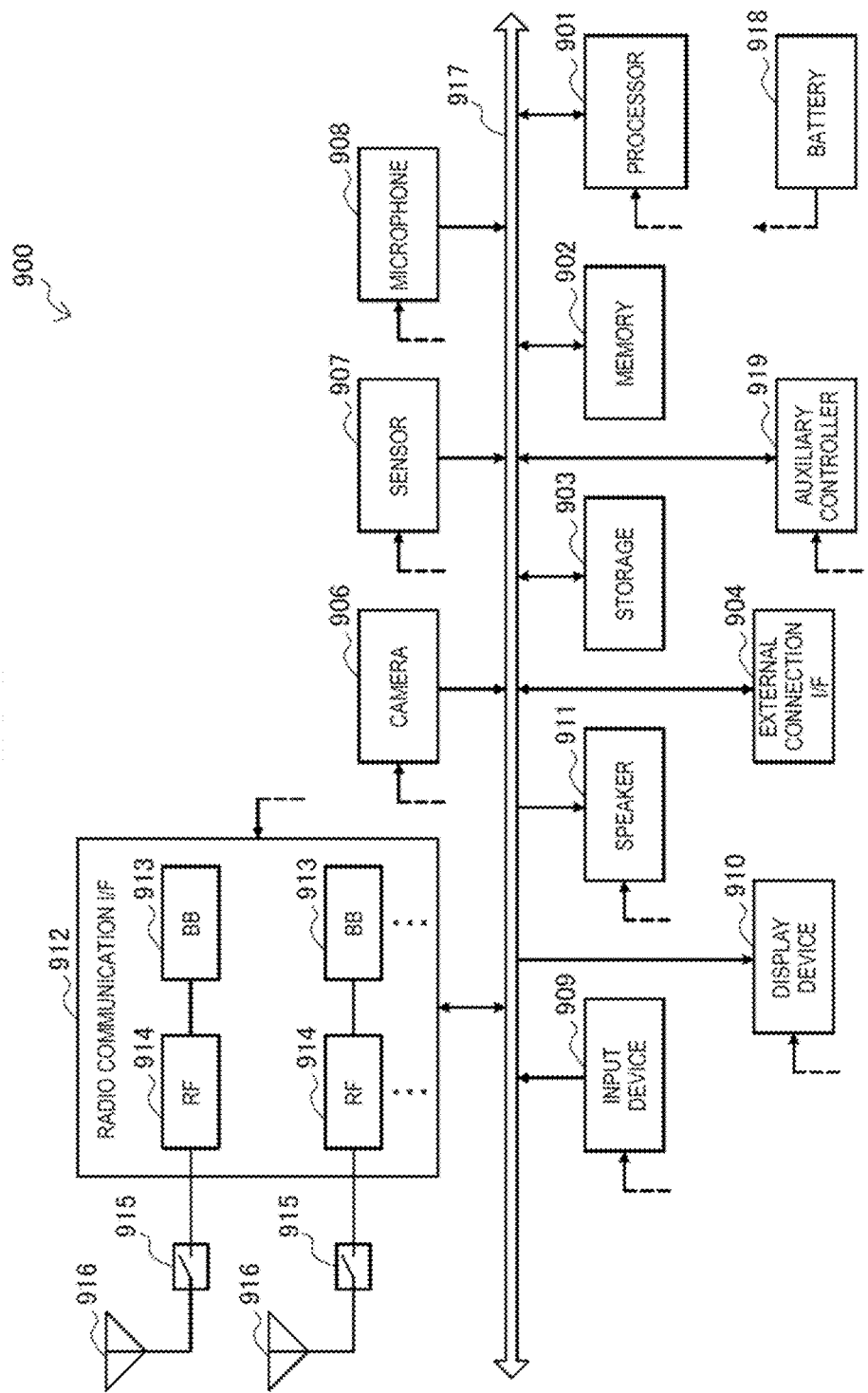
FIG. 13 is a block diagram showing an example of a schematic configuration of a smartphone to which the technology according to the present disclosure may be applied.

FIG. 13 is a block diagram illustrating an example of exemplary configuration of a smartphone 900 to which the technology of the present disclosure may be applied. The smartphone 900 includes a processor 901, a memory 902, a storage 903, an external connection interface 904, a camera 906, a sensor 907, a microphone 908, an input device 909, a display device 910, a speaker 911, a radio communication interface 912, one or more antenna switches 915, one or more antennas 916, a bus 917, a battery 918, and an auxiliary controller 919.

The processor 901 may be, for example, a CPU or a system on a chip (SoC), and controls functions of an application layer and another layer of the smartphone 900. The memory 902 includes a RAM and a ROM, and stores a program executed by the processor 901 and data. The storage 903 may include a storage medium such as a semiconductor memory and a hard disk. The external connection interface 904 is an interface for connecting an external device (such as a memory card and a universal serial bus (USB) device) to the smartphone 900.

The camera 906 includes an image sensor (such as a charge coupled device (CCD) and a complementary metal oxide semiconductor (CMOS)), and generates a captured image. The sensor 907 may include a group of sensors, such as a measurement sensor, a gyro sensor, a geomagnetism sensor, and an acceleration sensor. The microphone 908 converts sounds that are inputted to the smartphone 900 to audio signals. The input device 909 includes, for example, a touch sensor configured to detect touch onto a screen of the display device 910, a keypad, a keyboard, a button, or a switch, and receives an operation or information inputted from a user. The display device 910 includes a screen (such as a liquid crystal display (LCD) and an organic light-emitting diode (OLED) display), and displays an output image of the smartphone 900. The speaker 911 converts audio signals that are outputted from the smartphone 900 to sounds.

The radio communication interface 912 supports any cellular communication scheme (such as LTE and LTE-advanced), and performs a wireless communication. The radio communication interface 912 may include, for example, a BB processor 913 and an RF circuit 914. The BB processor 913 may perform, for example, encoding/decoding, modulating/demodulating, and multiplexing/de-multiplexing, and perform various types of signal processing for wireless communication. The RF circuit 914 may include, for example, a mixer, a filter and an amplifier, and transmits and receives wireless signals via the antenna 916. It should be noted that although FIG. 13 shows a case that one RF link is connected to one antenna, which is only illustrative, and a case that one RF link is connected to multiple antennas through multiple phase shifters may also exist. The radio communication interface 912 may be a chip module having the BB processor 913 and the RF circuit 914 integrated thereon. The radio communication interface 912 may include multiple BB processors 913 and multiple RF circuits 914, as shown in FIG. 13. Although FIG. 13 shows the example in which the radio communication interface 912 includes the multiple BB processors 913 and the multiple RF circuits 914, the radio communication interface 912 may also include a single BB processor 913 or a single RF circuit 914.

Furthermore, in addition to a cellular communication scheme, the radio communication interface 912 may support another type of wireless communication scheme such as a short-distance wireless communication scheme, a near field communication scheme, and a radio local area network (LAN) scheme. In this case, the radio communication interface 912 may include the BB processor 913 and the RF circuit 914 for each wireless communication scheme.

Each of the antenna switches 915 switches connection destinations of the antennas 916 among multiple circuits (such as circuits for different wireless communication schemes) included in the radio communication interface 912.

Each of the antennas 916 includes a single or multiple antenna elements (such as multiple antenna elements included in an MIMO antenna) and is used for the radio communication interface 912 to transmit and receive wireless signals. The smartphone 900 may include the multiple antennas 916, as shown in FIG. 13. Although FIG. 13 shows the example in which the smartphone 900 includes the multiple antennas 916, the smartphone 900 may also include a single antenna 916.

Furthermore, the smartphone 900 may include the antenna 916 for each wireless communication scheme. In this case, the antenna switches 915 may be omitted from the configuration of the smartphone 900.

The bus 917 connects the processor 901, the memory 902, the storage 903, the external connection interface 904, the camera 906, the sensor 907, the microphone 908, the input device 909, the display device 910, the speaker 911, the radio communication interface 912, and the auxiliary controller 919 to each other. The battery 918 supplies power to blocks of the smart phone 900 shown in FIG. 13 via feeder lines that are partially shown as dashed lines in FIG. 13. The auxiliary controller 919, operates a minimum necessary function of the smart phone 900, for example, in a sleep mode.

In the smart phone 900 shown in FIG. 13, the transceiving unit of the electronic apparatus 200 may be implemented by the radio communication interface 912. At least a part of the functions may also be implemented by the processor 901 or the auxiliary controller 919. For example, the processor 901 or the auxiliary controller 919 may acquire the DMRS by performing the functions of the first acquiring unit 201 and the second acquiring unit 202, and may also make a response to the instruction from the base station for instructing to use the REs in the OFDM symbols for the DMRS which are not occupied by the DMRS for data transmission by performing the function of the responding unit 203.

Second Application Example

Figure 14:
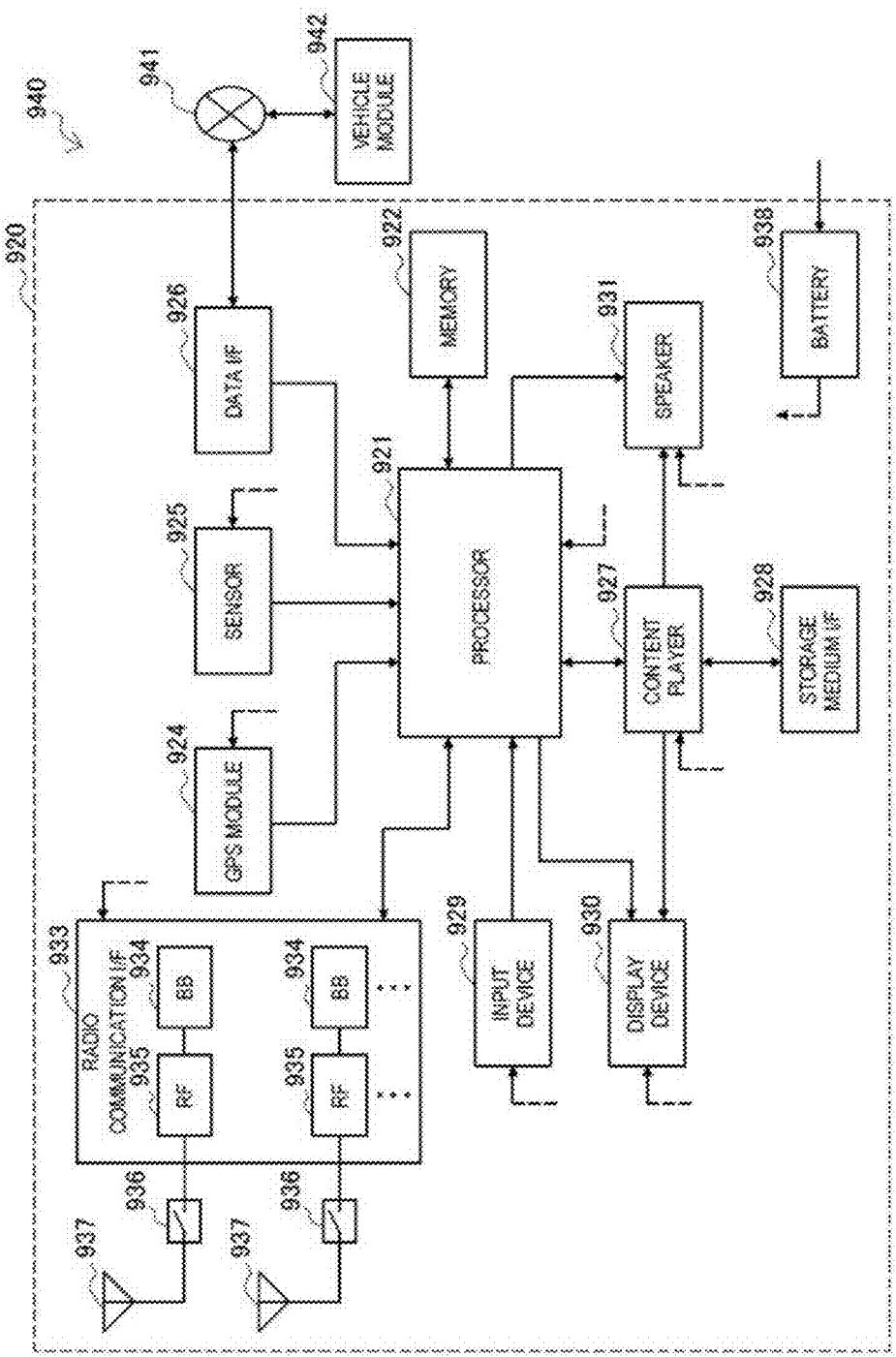
FIG. 14 is a block diagram showing an example of a schematic configuration of a car navigation device to which the technology of the present disclosure may be applied.

FIG. 14 is a block diagram showing an example of a schematic configuration of a car navigation device 920 to which the technology according to the present disclosure may be applied. The car navigation apparatus 920 includes a processor 921, a memory 922, a global positioning system (GPS) module 924, a sensor 925, a data interface 926, a content player 927, a storage medium interface 928, an input device 929, a display device 930, a speaker 931, a radio communication interface 933, one or more antenna switches 936, one or more antennas 937, and a battery 938.

The processor 921 may be, for example a CPU or a SoC, and controls a navigation function and additional function of the car navigation apparatus 920. The memory 922 includes RAM and ROM, and stores a program that is executed by the processor 921, and data.

The GPS module 924 determines a position (such as latitude, longitude and altitude) of the car navigation apparatus 920 by using GPS signals received from a GPS satellite. The sensor 925 may include a group of sensors such as a gyro sensor, a geomagnetic sensor and an air pressure sensor. The data interface 926 is connected to, for example, an in-vehicle network 941 via a terminal that is not shown, and acquires data (such as vehicle speed data) generated by the vehicle.

The content player 927 reproduces content stored in a storage medium (such as a CD and a DVD) that is inserted into the storage medium interface 928. The input device 929 includes, for example, a touch sensor configured to detect touch onto a screen of the display device 930, a button, or a switch, and receives an operation or information inputted from a user. The display device 930 includes a screen such as an LCD or OLED display, and displays an image of the navigation function or content that is reproduced. The speaker 931 outputs a sounds for the navigation function or the content that is reproduced.

The radio communication interface 933 supports any cellular communication scheme (such as LTE and LTE-Advanced), and performs wireless communication. The radio communication interface 933 may typically include, for example, a BB processor 934 and an RF circuit 935. The BB processor 934 may perform, for example, encoding/decoding, modulating/demodulating and multiplexing/demultiplexing, and perform various types of signal processing for wireless communication. The RF circuit 935 may include, for example, a mixer, a filter and an amplifier, and transmits and receives wireless signals via the antenna 937. The radio communication interface 933 may also be a chip module having the BB processor 934 and the RF circuit 935 integrated thereon. The radio communication interface 933 may include multiple BB processors 934 and multiple RF circuits 935, as shown in FIG. 14. Although FIG. 14 shows the example in which the radio communication interface 933 includes the multiple BB processors 934 and the multiple RF circuits 935, the radio communication interface 933 may also include a single BB processor 934 and a single RF circuit 935.

Furthermore, in addition to a cellular communication scheme, the radio communication interface 933 may support another type of wireless communication scheme such as a short-distance wireless communication scheme, a near field communication scheme, and a wireless LAN scheme. In this case, the radio communication interface 933 may include the BB processor 934 and the RF circuit 935 for each wireless communication scheme.

Each of the antenna switches 936 switches connection destinations of the antennas 937 among multiple circuits (such as circuits for different wireless communication schemes) included in the radio communication interface 933.

Each of the antennas 937 includes a single or multiple antenna elements (such as multiple antenna elements included in an MIMO antenna), and is used by the radio communication interface 933 to transmit and receive wireless signals. As shown in FIG. 14, the car navigation apparatus 920 may include the multiple antennas 937. Although FIG. 14 shows the example in which the car navigation apparatus 920 includes the multiple antennas 937, the car navigation apparatus 920 may also include a single antenna 937.

Furthermore, the car navigation apparatus 920 may include the antenna 937 for each wireless communication scheme. In this case, the antenna switches 936 may be omitted from the configuration of the car navigation apparatus 920.

The battery 938 supplies power to the blocks of the car navigation apparatus 920 shown in FIG. 14 via feeder lines that are partially shown as dash lines in FIG. 14. The battery 938 accumulates power supplied from the vehicle.

In the car navigation apparatus 920 shown in FIG. 14, the transceiving unit of the electronic apparatus 200 may be implemented by the radio communication interface 912. At least a part of the functions may be implemented by the processor 901 or the auxiliary controller 919. For example, the processor 901 or the auxiliary controller 919 may acquire the DMRS by performing the functions of the first acquiring unit 201 and the second acquiring unit 202, and may also make a response to the instruction from the base station for instructing to use the REs in the OFDM symbols for the DMRS which are not occupied by the DMRS for data transmission by performing the function of the responding unit 203.

The technology of the present disclosure may also be implemented as an in-vehicle system (or a vehicle) 940 including one or more blocks of the car navigation apparatus 920, the in-vehicle network 941 and a vehicle module 942. The vehicle module 942 generates vehicle data (such as a vehicle speed, an engine speed, and failure information), and outputs the generated data to the in-vehicle network 941.

The basic principle of the present disclosure has been described above in conjunction with particular embodiments. However, as can be appreciated by those ordinarily skilled in the art, all or any of the steps or components of the method and apparatus according to the disclosure can be implemented with hardware, firmware, software or a combination thereof in any computing device (including a processor, a storage medium, etc.) or a network of computing devices by those ordinarily skilled in the art in light of the disclosure of the disclosure and making use of their general circuit designing knowledge or general programming skills.

Moreover, the present disclosure further discloses a program product in which machine-readable instruction codes are stored. The aforementioned methods according to the embodiments can be implemented when the instruction codes are read and executed by a machine.

Accordingly, a memory medium for carrying the program product in which machine-readable instruction codes are stored is also covered in the present disclosure. The memory medium includes but is not limited to soft disc, optical disc, magnetic optical disc, memory card, memory stick and the like.

In the case where the present disclosure is realized with software or firmware, a program constituting the software is installed in a computer with a dedicated hardware structure (e.g. the general computer 1500 shown in FIG. 15) from a storage medium or network, wherein the computer is capable of implementing various functions when installed with various programs.

Figure 15:
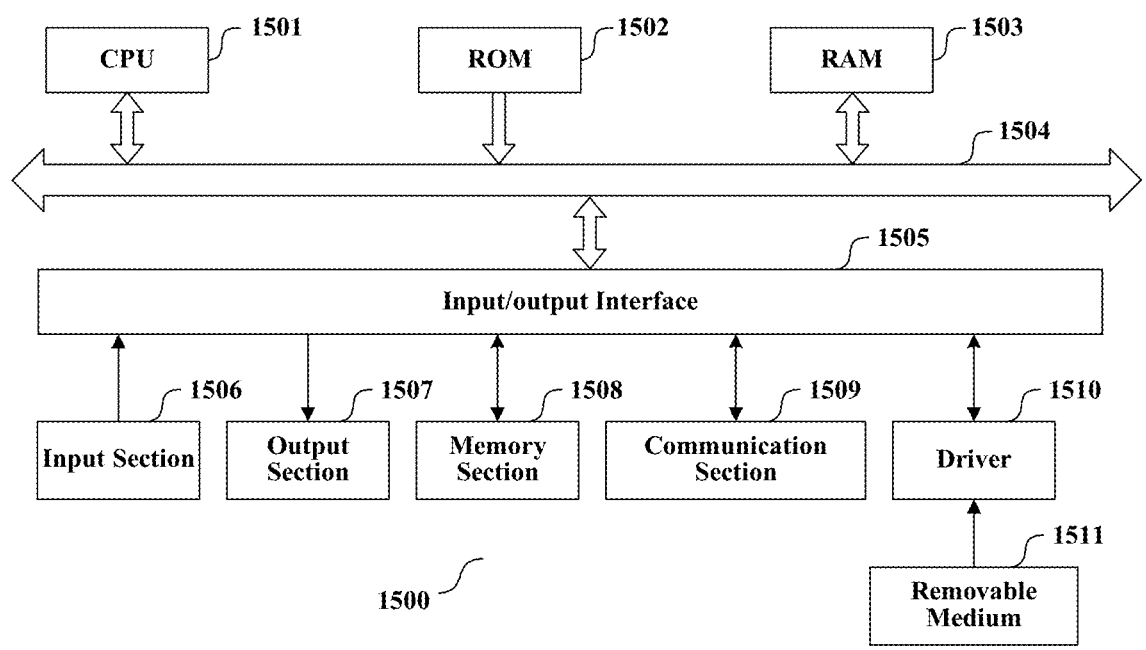
FIG. 15 is a block diagram of an exemplary block diagram illustrating the structure of a general purpose personal computer capable of realizing the method and/or device and/or system according to the embodiments of the present disclosure.

In FIG. 15, a central processing unit (CPU) 1501 executes various processing according to a program stored in a read-only memory (ROM) 1502 or a program loaded to a random access memory (RAM) 1503 from a memory section 1508. The data needed for the various processing of the CPU 1501 may be stored in the RAM 1503 as needed. The CPU 1501, the ROM 1502 and the RAM 1503 are linked with each other via a bus 1504. An input/output interface 1505 is also linked to the bus 1504.

The following components are linked to the input/output interface 1505: an input section 1506 (including keyboard, mouse and the like), an output section 1507 (including displays such as a cathode ray tube (CRT), a liquid crystal display (LCD), a loudspeaker and the like), a memory section 1508 (including hard disc and the like), and a communication section 1509 (including a network interface card such as a LAN card, modem and the like). The communication section 1509 performs communication processing via a network such as the Internet. A driver 1510 may also be linked to the input/output interface 1505, if needed. If needed, a removable medium 1511, for example, a magnetic disc, an optical disc, a magnetic optical disc, a semiconductor memory and the like, may be installed in the driver 1510, so that the computer program read therefrom is installed in the memory section 1508 as appropriate.

In the case where the foregoing series of processing is achieved through software, programs forming the software are installed from a network such as the Internet or a memory medium such as the removable medium 1511.

It should be appreciated by those skilled in the art that the memory medium is not limited to the removable medium 1511 shown in FIG. 15, which has program stored therein and is distributed separately from the apparatus so as to provide the programs to users. The removable medium 1511 may be, for example, a magnetic disc (including floppy disc (registered trademark)), a compact disc (including compact disc read-only memory (CD-ROM) and digital versatile disc (DVD), a magneto optical disc (including mini disc (MD) (registered trademark)), and a semiconductor memory. Alternatively, the memory medium may be the hard discs included in ROM 1502 and the memory section 1508 in which programs are stored, and can be distributed to users along with the device in which they are incorporated.

To be further noted, in the apparatus, method and system according to the present disclosure, the respective components or steps can be decomposed and/or recombined. These decompositions and/or recombinations shall be regarded as equivalent solutions of the disclosure. Moreover, the above series of processing steps can naturally be performed temporally in the sequence as described above but will not be limited thereto, and some of the steps can be performed in parallel or independently from each other.

Finally, to be further noted, the term "include", "comprise" or any variant thereof is intended to encompass nonexclusive inclusion so that a process, method, article or device including a series of elements includes not only those elements but also other elements which have been not listed definitely or an element(s) inherent to the process, method, article or device. Moreover, the expression "comprising a(n). . . " in which an element is defined will not preclude presence of an additional identical element(s) in a process, method, article or device comprising the defined element(s)" unless further defined.

Although the embodiments of the present disclosure have been described above in detail in connection with the drawings, it shall be appreciated that the embodiments as described above are merely illustrative rather than limitative of the present disclosure. Those skilled in the art can make various modifications and variations to the above embodiments without departing from the spirit and scope of the present disclosure. Therefore, the scope of the present disclosure is defined merely by the appended claims and their equivalents.

The invention claimed is:

1. An electronic apparatus for wireless communications, comprising:
processing circuitry, configured to:
generate a first indication indicating the number of orthogonal frequency division multiplexing symbols which are occupied by a front-loaded demodulation reference signal;
generate a second indication indicating a configuration of an additional demodulation reference signal;
determine, based on the first indication and the second indication, a pattern of a demodulation reference signal, and generate a pattern index corresponding to the pattern to be provided to user equipment; and
determine, based on the number of resource elements within the orthogonal frequency division multiplexing symbols for the demodulation reference signal which are not occupied by the demodulation reference signal, whether to use these unoccupied resource elements for data transmission.

2. The electronic apparatus according to claim 1, wherein, the processing circuitry is configured to generate the first indication based on the number of transmission layers or the number of ports for an orthogonal demodulation reference signal.

3. The electronic apparatus according to claim 1, wherein, the processing circuitry is further configured to determine the configuration of the additional demodulation reference signal based on a moving speed of the user equipment.

4. The electronic apparatus according to claim 1, wherein, the configuration of the additional demodulation reference signal comprises one or more of the following: whether to set the additional demodulation reference signal or not, the number of orthogonal frequency division multiplexing symbols which are occupied by the additional demodulation reference signal, a location of the orthogonal frequency division multiplexing symbols which are occupied by the additional demodulation reference signal, and a density of the additional demodulation reference signal.

5. The electronic apparatus according to claim 4, wherein, the number of the orthogonal frequency division multiplexing symbols which are occupied by the additional demodulation reference signal is determined based on the first indication.

6. The electronic apparatus according to claim 1, wherein, the processing circuitry is further configured to contain the first indication in a radio resource control signaling to be provided to the user equipment, such that the user equipment determines the pattern of the demodulation reference signal by combining the first indication and the pattern index.

7. The electronic apparatus according to claim 6, wherein, the processing circuitry is configured to add one bit information element DMRS OFDM in the radio resource control signaling to represent the first indication, wherein DMRS_OFDM being 1 represents that the number of the orthogonal frequency division multiplexing symbols which are occupied by the front-loaded demodulation reference signal is 1, and DMRS_OFDM being 0 represents that the number of the orthogonal frequency division multiplexing symbols which are occupied by the front-loaded demodulation reference signal is 2.

8. The electronic apparatus according to claim 1, wherein, the processing circuitry is further configured to contain the pattern index in downlink control information to be provided to the user equipment.

9. The electronic apparatus according to claim 8, wherein, the pattern index comprises the number of orthogonal frequency division multiplexing symbols by which the additional demodulation reference signal is offset relative to the front-loaded demodulation reference signal.

10. An electronic apparatus for wireless communications, comprising:
processing circuitry, configured to:
generate a first indication indicating the number of orthogonal frequency division multiplexing, symbols which are occupied by a front-loaded demodulation reference signal;
generate a second indication indicating a configuration of an additional demodulation reference signal;
determine based on the first indication and the second indication, a pattern of a demodulation reference signal, and generate a pattern index corresponding to the pattern to be provided to user equipment; and
determine, based on a channel quality indicator of the user equipment, whether to perform scheduling of multiple user transmission on the user equipment.

11. The electronic apparatus according to claim 10, wherein, the processing circuitry is further configured to create, with respect to a case of single user transmission, a correspondence table of the pattern index of the demodulation reference signal with the number of resource elements within the orthogonal frequency division multiplexing symbols for the demodulation reference signal which are not occupied by the demodulation reference signal.

12. The electronic apparatus according to claim 1, wherein, the processing circuitry is further configured to create a bitmap of port usage conditions of the demodulation reference signal.

13. The electronic apparatus according to claim 1, wherein, the processing circuitry is further configured to generate a signaling for instructing the user equipment to use the unoccupied resource elements for data transmission and contain the signaling in downlink control information.

14. An electronic apparatus for wireless communications, comprising:
processing circuitry, configured to:
acquire, from a base station, a pattern index indicating a pattern of a demodulation reference signal, wherein, the pattern of the demodulation reference signal indicates: the number and a location of orthogonal frequency division multiplexing symbols which are occupied by a front-loaded demodulation reference signal, and a configuration of an additional demodulation reference signal;
acquire the demodulation reference signal based on the pattern indicated by the pattern index; and
acquire, from the base station,. an instruction indicating whether to use resource, elements in the orthogonal frequency division multiplexing symbols for the demodulation reference signal which are not occupied by the demodulation reference signal for data transmission or for power boosting of the demodulation reference signal.

15. The electronic apparatus according to claim 14, wherein the processing circuitry is configured to acquire a first portion of the pattern index via a radio resource control signaling, and acquire a second portion of the pattern index via downlink control information, wherein, the first portion indicates the number of orthogonal frequency division multiplexing symbols occupied by the front-loaded demodulation reference signal, and the second portion indicates the location of the orthogonal frequency division multiplexing symbols occupied by the front-loaded demodulation reference signal and/or the configuration of the additional demodulation reference signal, or the processing circuitry is configured to acquire the pattern index via downlink control information.

16. The electronic apparatus according to claim 14, wherein the processing circuitry is further configured to generate a response to the instruction.

17. The electronic apparatus according to claim 15, wherein the second portion comprises the number of orthogonal frequency division multiplexing symbols by which the additional demodulation reference signal is offset relative to the front-loaded demodulation reference signal.

18. A method for wireless communications, comprising:

generating a first indication indicating the number of orthogonal frequency division multiplexing symbols which are occupied by a front-loaded demodulation reference signal;

generating a second indication indicating a configuration of an additional demodulation reference signal;

determining, based on the first indication and the second indication, a pattern of a. demodulation reference signal, and generating a pattern index corresponding to the pattern to be provided to user equipment; and determining, based on the number of resource elements within the orthogonal frequency division multiplexing symbols for the demodulation reference signal which are not occupied by the demodulation reference signal, whether to use these unoccupied resource elements for data transmission.

* * * * *